Nov. 15, 1938.　　　　P. F. WEBER　　　　2,137,194
INDICATING INSTRUMENT
Filed July 5, 1934　　　2 Sheets-Sheet 1

INVENTOR.
Philip F. Weber
BY Stephen Cerstvik
ATTORNEY.

Nov. 15, 1938.   P. F. WEBER   2,137,194
INDICATING INSTRUMENT
Filed July 5, 1934   2 Sheets-Sheet 2
Fig. 4
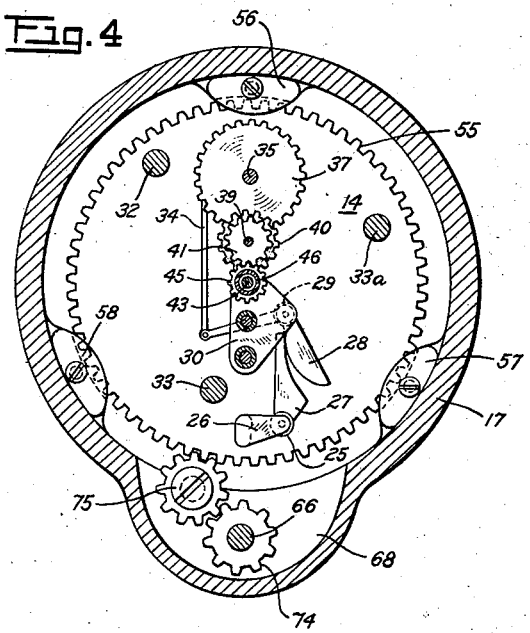
Fig. 5
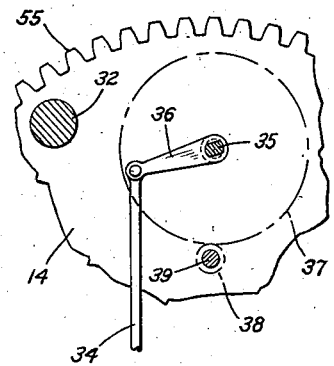
Fig. 7
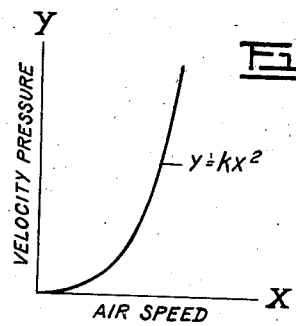
Fig. 6
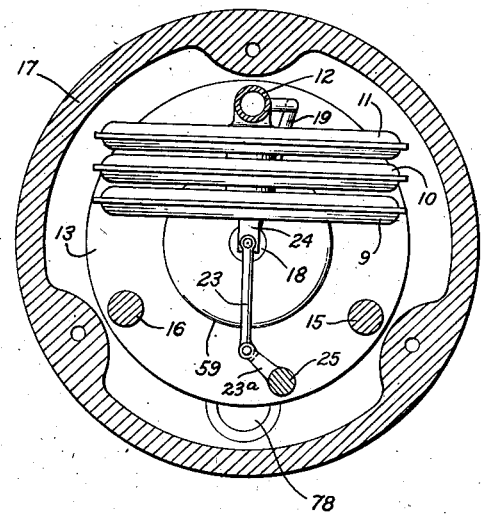
Fig. 8
INVENTOR.
Philip F. Weber
BY Stephen Gerstvik
ATTORNEY.

Patented Nov. 15, 1938

2,137,194

UNITED STATES PATENT OFFICE 2,137,194

INDICATING INSTRUMENT

Philip F. Weber, Monmouth Beach, N. J., assignor to Bendix Aviation Corporation, South Bend, Ind., a corporation of Delaware Application July 5, 1934, Serial No. 733,856

5 Claims. (Cl. 73—2)

The present invention relates to indicating instruments and more particularly to sensitive indicating instruments of the pressure actuated type such, for example, as aircraft air-speed indicators.

Heretofore, aircraft air-speed indicators were provided with only a single pointer operating over an associated dial but it was found that such instruments were not sufficiently sensitive and, therefore, accurate readings of relatively small changes of air speed could not be obtained by the single pointer.

Accordingly, one of the objects of the present invention is to provide a novel aircraft air-speed indicating instrument of the pressure actuated type having two pointers, preferably concentrically arranged, operated by a pressure responsive device such as an expansible diaphragm, through a motion transmitting and amplifying mechanism, said pointers being intergeared so that one rotates only a fraction of a revolution for a complete revolution of the other, i. e., one being a slow-moving pointer and the other a fast-moving pointer, respectively. The fast-moving pointer may be arranged to indicate tens of miles or knots per hour and the slow-moving pointer to indicate hundreds of miles or knots per hour.

It has also been found that in pressure actuated instruments having a pointer actuated by a pressure responsive device such as an expansible diaphragm, operated by pressures produced by a factor to be indicated which has a non-linear relation to said pressures, the diaphragm expands and contracts in unequal increments for equal increments of change of the factor and even more so in aircraft air-speed indicators in which the diaphragm is actuated by impact or velocity pressures transmitted thereto by a Pitot tube because the velocity pressure produced in the Pitot tube by movement of the aircraft through the air is substantially proportional to the square of the air speed, i. e., if the velocity pressures be plotted as ordinates against air speeds as abscissae, it will be found that the curve is substantially a vertical parabola of the form $y=kx^2$.

This unequal increment variation of the diaphragm was not visible or readily perceived in an air-speed indicator having only a single pointer operating over a dial calibrated to indicate from zero to approximately 300 miles per hour for one complete revolution of the pointer, the latter not making more than a single revolution. When, however, such an instrument was provided with two pointers, one moving rapidly to indicate from zero to approximately 100 miles per hour in ten increments of ten miles per hour for one revolution and capable of making several revolutions over the dial, and the other moving slowly to indicate hundreds of miles per hour on the same scale of the dial, the unequal increments of expansion and contraction of the pressure responsive device became greatly magnified by the pointers so that the scale graduations of the dial had to be extremely unequally spaced to get accurate readings of the pointers, particularly of the fast-moving pointer, for equal increments of change of air speed. Hence, the dial of one instrument could not be employed in another instrument of the same type and the dial of each instrument required separate calibration or marking, thus necessitating a special dial for each instrument thereby increasing the manufacturing costs thereof and bringing out the unequal spacing of the scale graduations very prominently.

It was also found to be impossible to use two pointers with a single scale having unequally spaced graduations and one pointer making several revolutions for one revolution of the other because after the fast-moving pointer completed its first revolution, it would not coincide with the scale graduations on its second revolution and then on its third revolution, nor could the slow-moving pointer coincide with the same scale graduations as the large pointer because their increments of angular movement were different. Therefore, unless an equally divided scale were provided, there would have to be a separate scale for each revolution of the fast-moving pointer or else a continuous scale extended somewhat like a spiral, and a separate scale for the slow-moving pointer. Obviously, such an instrument would be expensive to make, difficult to read, and, therefore, extremely undesirable for practical use.

It, therefore, became imperative, for the sake of accuracy and symmetrical appearance, to devise suitable means for such instruments whereby the unequal increments of expansion and contraction of the expansible pressure responsive diaphragm for equal increments of change of a factor producing the pressures which actuate the diaphragm, could be changed into equal increments of angular travel of the pointers, thereby making it possible to employ a dial having equally spaced scale graduations with which both pointers cooperate.

Accordingly, another object of the invention is to provide such novel means in a pressure actuated instrument having a dial, a fast-moving pointer and a slow-moving pointer operating over said dial by a pressure responsive device which expands or contracts in unequal increments for equal increments of change of a factor having a non-linear relation to the pressures produced thereby, so that such unequal increments are changed into equal increments of angular travel of the pointers over said dial, thus making it possible to provide a dial having equally spaced scale graduations with which both pointers co-operate.

Also, when a pressure actuated instrument of the class described is to be used in such a manner that the pressure responsive device is actuated by a pressure which is a function of a factor contributing in the maintenance of a desired condition, said factor being indicated on the dial by both pointers, it is desirable that the instrument be capable of adjustment so as to bring the fast-moving pointer, when both pointers are indicating or are to indicate the value of the factor required to maintain said condition, into a position in which said pointer bears a definite relation to the condition to be maintained. For example, if the instrument be an aircraft air-speed indicator having a pressure responsive expansible diaphragm actuated by velocity pressures produced in a Pitot tube by relative movement of the aircraft through the air, the factor to be indicated is, of course, the air speed of the craft and the condition desired to be maintained is level flight, to the maintenance of which the air speed is one of the necessary factors because if the aircraft inclines upward for a climb, with a constant throttle setting, the air speed decreases and if the aircraft inclines downward for a dive, without changing the throttle setting, the air speed increases. Therefore, by adjusting the air-speed indicator, as by rotating the dial, the pointers, the pressure responsive device and the motion-transmitting mechanism as a unit relative to the casing of the instrument, until the fast-moving pointer is in a horizontal position from which an upward movement of the pointer causes the reading on the dial to decrease and a downward movement causes said reading to increase, then in this position the pointer bears a definite relation to the condition of level flight because the upward movement of the pointer will take place when the aircraft is inclined upward and the downward movement of the pointer will take place when the aircraft is inclined downward. Thus, the instrument is made to serve two purposes, namely, to indicate the air speed of the craft and also the attitude of the craft with respect to its transverse axis, i. e., a change in the condition of level flight due to a change in the air speed which is a factor contributing in the maintenance of that condition.

Accordingly a still further object of the present invention is to provide a novel pressure actuated instrument such as an air-speed indicator, for example, having a casing, a fast-moving pointer and a slow-moving pointer cooperating with a dial having equally spaced scale graduations, and actuated through a motion amplifying and transmitting mechanism by a pressure responsive device which expands and contracts in unequal increments for equal increments of change of air speed, means in the transmission mechanism between said pointers and said pressure responsive device for changing the unequal increments of expansion and contraction of said device into equal increments of angular travel of the pointers over the dial, means mounting said dial, said pointers, said pressure responsive device and said transmission mechanism for adjustable rotation as a unit in said casing, and means for rotating said dial, said pointers, said pressure responsive device and said mechanism as a unit in said casing to bring the fast-moving pointer into a position in which said pointer bears a definite relation to a condition desired to be maintained, said pressure responsive device being actuated by a pressure which is a function of a factor contributing in the maintenance of said condition, the value of said factor being indicated on the dial by both of said pointers.

The above and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for the purposes of illustration and description only and are not to be construed as specifically defining the limits of the invention, reference being had to the appended claims for this purpose.

In the drawings wherein like reference characters refer to like parts throughout the several views:

Fig. 4 is a transverse section of the instrument taken on line 4—4 of Fig. 3;

Fig. 5 is a partial sectional view taken on line 5—5 of Fig. 3;

Fig. 6 is another transverse section taken on line 6—6 of Fig. 3;

Fig. 7 is a graph of a curve showing the approximate relation between velocity pressures and air speeds of an aircraft; and Fig. 8 is another partial sectional view taken on line 8—8 of Fig. 3.

Figure 1:
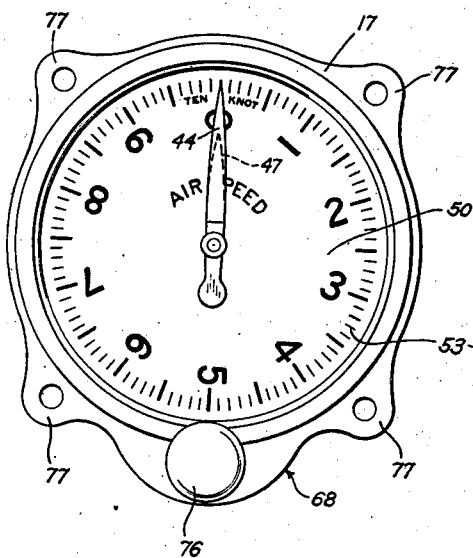
Fig. 1 is a front view of one type of instrument embodying the present invention and shown as an aircraft airspeed indicator.

Referring now to the drawings, the instrument embodying the present invention is shown in the form of an air-speed indicator having a pressure responsive device which is adapted to expand and contract upon variations of velocity pressures due to changes in the speed of the aircraft through the air, and motion amplifying and transmitting mechanism for amplifying the relatively small movements of the pressure sensitive element into readily discernible movements of a plurality of pointers over a cooperating dial to indicate the air speed in miles or knots per hour, the pointers being geared together in such a manner that one makes only a fraction of a revolution for one complete revolution of the other, the latter being a fast-moving pointer and indicating the air speed in tens of miles or knots per hour and the former being a slow-moving pointer and indicating the air speed in hundreds of miles or knots per hour.

Figure 3:
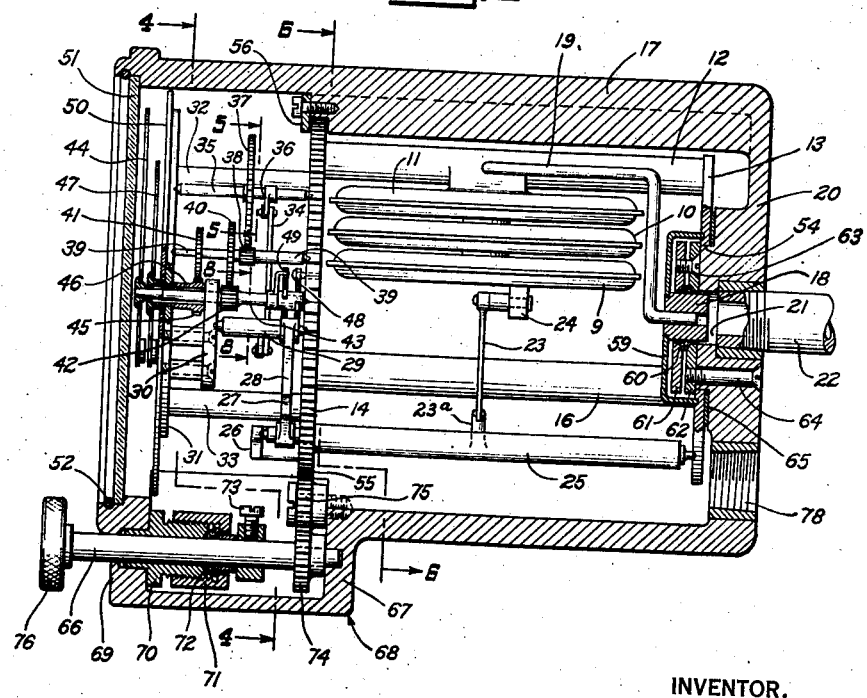
Fig. 3 is a longitudinal section through the casing of the instrument shown in Figs. 1 and 2 illustrating the arrangement and functional relation of the elements of the whole mechanism of the instrument.

In the form shown in Fig. 3, the pressure responsive device comprises one or more capsules such, for example, as 9, 10 and 11 carried by a supporting member in the form of a transversely extending hollow rod 12 carried by or secured to a circular plate 13, the latter being secured to and spaced from a cooperating supporting plate 14 by means of other transversely extending rods 15 and 16 (Fig. 6) so that said plates 13 and 14 form a unitary supporting structure for the entire mechanism of the air-speed indicator whereby it may be readily inserted into or withdrawn from a suitable cup-shaped casing 17 and journaled in the latter in a manner and for a purpose to be described hereinafter. The interior of the capsules 9, 10 and 11 constituting the pressure responsive device, is connected to an outlet member 18 by means of a conduit 19, said outlet member 18 being located centrally of the rear wall 20 of the casing 17 which is provided with a central opening 21 to which may be connected a pipe 22 by means of which velocity pressures produced in a Pitot tube (not shown) by relative movement of an aircraft through the air may be transmitted through the conduit 19 to the interior of the capsules 9, 10 and 11 whereby expansion thereof results in accordance with the variations in said velocity pressures due to changes in air speed of the aircraft.

Means are provided for employing and amplifying the movements of the pressure responsive device upon actuation thereof due to changes in pressure produced by changes in air speed to produce indications in miles or knots per hour. In the form shown, said means comprise a link 23 one end of which is pivotally connected to a stud 24 carried by the capsule 9 and the other end of which is pivotally connected to a rock shaft 25 journaled in the plate 13 and in a bracket 26 carried by the plate 14, said rock shaft extending through the latter. Rigidly secured to the projecting end of the rock shaft 25 is a driving cam member 27 (Fig. 4) which cooperates with a follower cam 28 rigidly secured to a stub shaft 29, the latter being journaled in the plate 14 and in a sub-plate 30 carried by another plate 31 which is secured to the plate 14 by means of spacing rods 32, 33 and 33a. Pivotally secured to the stub shaft 29 is another link 34 which connects said shaft to a counter shaft 35 by means of a crank 36 so that upon expansion and contraction of the capsules 9, 10 and 11, the shaft 25 is caused to rock on its pivots, thus transmitting the motion of said capsules to the counter shaft 35 through the cam members 27 and 28 and through the link 34 and crank 36. Secured to and carried by the counter shaft 35 is a relatively large gear 37 which meshes with a relatively small pinion 38 carried by another counter shaft 39 also journaled in the plates 14 and 31. On the same shaft with pinion 38 there are mounted a relatively large gear 40 and a relatively small gear 41. The former meshes with a pinion 42 carried by a shaft 43 which is journaled in the plate 14 and in the sub-plate 30, one end of said shaft projecting through the plate 31 and having secured thereto a large pointer 44. The other gear 41 meshes with a pinion 45 secured to or formed integral with a hollow shaft 46, said hollow shaft being journaled on the shaft 43 which extends therethrough. Secured to the hollow shaft 46 is a small pointer 47. Thus, the rotation of the counter shaft 35 produces a relatively fast rotation of the large pointer 44 through the gear 37, pinion 38, gear 40 and pinion 42. Simultaneously with the fast rotation of the pointer 44, a relatively slow rotation is imparted to the pointer 47 through the gear 37, pinion 38, gear 41 and pinion 45 so that the small pointer 47 makes only a fraction of a revolution for one complete revolution of the large pointer 44, the latter being adapted to make several revolutions.

The rotation of the pointers 44 and 47, upon expansion of the capsules 9, 10 and 11, is effected by a pair of interconnected hair springs 48 and 49 which are normally under tension when the pointers are at zero on the dial and there is no pressure in the capsules. As the capsules expand, they rock the shaft 25 counter-clockwise as viewed in Figs. 4 and 6, thereby rotating the cam member 27 counter-clockwise. As the cam 27 rotates, the follower cam 28 is caused to follow it by the action of the tension of the hair springs 48 and 49, and by virtue of the specially formed surfaces of said cams a substantially rolling action takes place, i. e., cam 28 rolls on cam 27. Then when the capsules contract, the shaft is rocked clockwise thereby rotating the driving cam 27 clockwise. Then the cam 27 drives the follower cam 28, causing the hair springs 48 and 49 to wind up again as the pointers 44 and 47 return to zero. Inasmuch as the pointer shaft 43, with which the hair springs are associated, makes more than one revolution, said hair springs are preferably of the type disclosed in U. S. Patent No. 1,873,284 of Victor E. Carbonara, whereby their action is cumulative to permit such increased rotation of the pointer. The hair springs also serve to take up back-lash in the gear system. An elongated coil spring (not shown) may be provided for returning the rock shaft 25 back to normal position when the capsules 9, 10 and 11 contract, in which case one end of the spring could be connected to the arm 23a, and the other end to the post 15. Such a spring, however, may be necessary only if the contracting force of the capsules is insufficient to pull the rock shaft back and forms no part of the present invention.

The pointers 44 and 47 cooperate with a relatively stationary dial 50 carried by and secured to the front of the plate 31 so that the indications of the pointers 44 and 47 are visible from the front of the instrument casing 17 through a cover glass 51 secured in said casing in any suitable manner as by means of a clamping ring 52. The dial 50 is provided with a scale 53 calibrated, in the present instance, in equally spaced main graduations from 1 to 10 with ten subdivisions between two consecutive main graduations to denote air speed in equal increments of ten miles or knots per hour by the large pointer and in increments of one hundred miles or knots per hour by the small pointer 47, since said pointers are geared together in a ratio of 10 to 1.

Inasmuch as the capsules 9, 10 and 11 expand and contract in unequal increments for equal increments of change of air speed, it is desirable to change such unequal increments into equal increments of angular travel of the pointers 44 and 47 so that the latter will coincide with the equally spaced graduations of the scale 53 on the dial 50 at the indicated values. In the form shown, said means are constituted by the cam members 27 and 28 which are so designed as to amplify the motion of the rock shaft in such a manner that the angular motion of shaft 29 will follow a linear function, i. e., the shaft 29 will move through equal angles for equal increments of change of air speed. Thus, the pointers 44 and 47 will indicate equal changes in their angular positions for equal increments of change of air speed, but since the gear ratio therebetween is 10 to 1, the large pointer 44 will move ten times as fast as the small pointer 47. In other words, although the movement of the rock shaft 25 follows substantially the curve shown in Fig. 7 of the drawings, the motion of shaft 29 will follow substantially a straight line by virtue of the shape of the surfaces of cams 27 and 28. The surfaces are readily determined from the equation of the curve shown in Fig. 7, which is substantially a parabola of the form $y=kx^2$. In this manner of operation of the pointers 44 and 47, it is possible to use the same scale 53, the graduations of which are spaced in ten equal increments, each increment denoting 10 miles or knots per hour when read with the large pointer 44 and denoting 100 miles per hour when read with the small pointer 47. Also, by the provision of an equally divided scale 53 on the dial 50, the latter may be interchanged with a dial of another instrument of the same type, and only one scale is necessary for both pointers, thus making it possible to manufacture the dials in large quantities separately from the instruments and making it unnecessary to specially calibrate a dial for each instrument.

As was previously pointed out, when a pressure actuated instrument of the type herein disclosed is to be used in such a manner that the capsules 9, 10 and 11 are to be actuated by a pressure which is a function of a factor contributing in the maintenance of a desired condition, the factor being indicated on the scale 53 by both pointers 44 and 47, it is desirable that the instrument be capable of adjustment so as to bring the large fast-moving pointer 44, when both pointers are to indicate the value of the factor required to maintain said condition, into a position in which said large fast-moving pointer 44 bears a definite relation to the condition to be maintained and, for this purpose, the entire mechanism carried by the plates 13 and 14, including the pressure responsive capsules 9, 10 and 11, the dial 50, the gear system and the pointers 44 and 47, is mounted for complete rotation within the casing 17. To this end the plate 13 is centrally journaled on a boss 54 formed integral with the rear wall 20 of the casing 17 and the front plate 14 is provided on its periphery with gear teeth 55, said plate 14 being held in position by means of a plurality of gibs 56, 57 and 58 (Fig. 4) in such a manner that it is permitted to rotate within said casing.

In order to prevent leakage in the outlet member 18, a gland assembly is provided between the plate 13 and the boss 54 of the casing, said gland assembly being constituted by a cover 59, the periphery of which is secured to the plate 13 and the center of which is secured to the outlet member 18. Within the cover 59 there is provided a leak-proof gasket 60 encircling the outlet member 18 and positioned between a pair of plates 61 and 62 so that said gasket may be tightened on the outlet member 18 by tightening a pair of screws which hold the plates 61 and 62 together, one of said screws being shown at 63 in Fig. 3. Plates 61 and 62 and the gasket 60 are held stationary by means of a screw 64 extending through the rear wall 20 of the casing 17 while the outlet member 18 and the cover 59 are rotatable with the plate 13. To reduce the friction between the plate 13 and the rear wall 20 upon relative angular movement therebetween, there is provided a bearing washer 65.

Means are now provided for rotating the entire mechanism including the pressure responsive capsules 9, 10 and 11, the pointers 44 and 47 and the dial 50 as a unit with respect to the casing and, in the form shown, said means comprise a shaft 66, one end of which is journaled in a rear wall 67 of an auxiliary chamber 68 formed integrally with the casing 17, and the other end of which is journaled in the front wall 69 of said auxiliary chamber 68 by means of a gland assembly constituted by a hollow threaded member 70 and a cooperating threaded nut 71 between which is interposed a gasket 72 which is arranged to be tightened by taking up on the nut 71. The gland assembly is secured to the shaft 66 by means of a set screw 73. At its inner end, the shaft 66 is provided with a pinion 74 which meshes with an idler gear 75, the latter in turn meshing with the gear teeth 55 provided on the plate 14. In order to rotate the shaft 66 from the exterior of the casing 17, the outer end of said shaft is provided with a knurled knob 76.

The instrument casing 17 is provided with a plurality of ears or lugs 77 for mounting it on an instrument panel (not shown), and is also provided with a threaded opening 78 in the rear wall 20 for connecting the interior of said casing to a source of static atmospheric pressure by means of a suitable pipe (not shown).

Figure 2:
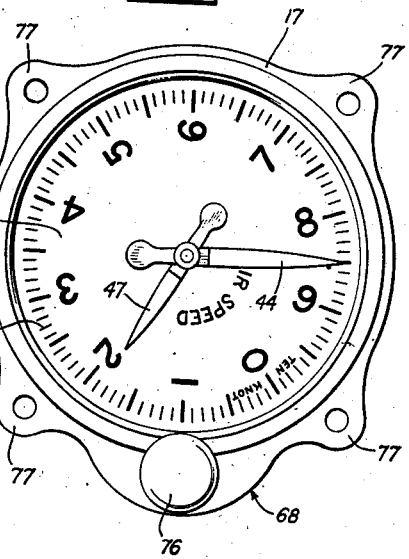
Fig. 2 is a similar view showing the instrument adjusted so that the fast-moving pointer is in a position in which said pointer bears a definite relation to a condition desired to be maintained, said condition being maintained by a factor the value of which is indicated on the dial by both pointers.

Assuming that the cruising speed of an aircraft on which the instrument shown in Fig. 1 is mounted is 185 miles or knots per hour and that the instrument is an air-speed indicator, as shown, the air speed is then a factor contributing in the maintenance of a level flight condition and its value must be 185 at all times for such level flight, as indicated on the dial by both pointers 44 and 47. To indicate such level flight, at an air speed of 185 miles or knots per hour, the knurled knob 76 is rotated until the dial and the pointers take the position shown in Fig. 2, i. e., until the large fast-moving pointer is in a horizontal position when it coincides with the subdivision midway between the main graduations "8" and "9" of the scale, at which time the small slow-moving pointer is midway between the small sub-divisions "8" and "9" between the main graduations "1" and "2" and the dial is in a position in which an upward movement of the pointer 44 gives a decreased reading and a downward movement gives an increased reading on the scale. By means of the small pointer 47, it is noted that the air speed is somewhere between 180 and 190 and by means of the large pointer 44 the exact reading is shown to be 185 miles or knots per hour, and also that the aircraft is neither climbing nor descending when said large pointer is not moving from its horizontal position. If, however, the air speed decreases, the pointer 44 will move upward and will indicate that the aircraft is inclined upward because that is what occurs when the air speed decreases without change of throttle. On the other hand, if the air speed increases, the pointer will move downward and will indicate that the aircraft is inclined downward inasmuch as the air speed increases at that time without change of throttle. Thus, the large pointer 44, when in a horizontal position, serves two purposes, namely to indicate air speed and level flight.

If the landing speed of the aircraft be 50 miles or knots per hour, the pilot, just before landing, can adjust the indicator until the main graduation "5" is in the horizontal position and then when the air speed is 50, the pilot will merely have to maintain the large pointer 44 in the horizontal position until his landing wheels or pontoons strike the ground or water, as the case may be.

There is thus provided a novel indicating instrument of the pressure actuated type, such as an air-speed indicator, having two pointers operated by a pressure responsive device through a motion transmitting and amplifying mechanism and intergeared so that one rotates only a fraction of a revolution for a complete revolution of the other. Novel means are also provided whereby the unequal increments of expansion and contraction of the pressure responsive device are converted into equal angular movements of the pointers over a co-operating dial and whereby the pointers may be made to co-operate with a single scale. Novel means are also provided whereby the instrument may be adjusted so as to bring the fast-moving pointer into a position in which said pointer bears a definite relation to a condition desired to be maintained while the pointers are indicating the required value of a factor contributing in the maintenance of said condition.

Although only one embodiment of the invention has been illustrated and described, various changes in the form and relative arrangement, which will now appear to those skilled in the art, may be made without departing from the scope of the invention. The cam arrangement, for example, or its equivalent, may be employed with an instrument having a single pointer when it is desired to have an equally divided scale for said pointer. Reference is, therefore, to be had to the appended claims for a definition of the limits of said invention.

What is claimed is:

1. In an air-speed indicator having a casing, the combination of a rotatable support journaled in said casing, a pressure responsive device mounted on and rotatable with said rotatable support, means connecting the interior of said device to the exterior of the casing, and means forming an air-tight seal at said connecting means whereby said pressure responsive device and its rotatable support may be rotated relative to the casing while maintaining a substantially airtight connection between the interior of said pressure responsive device and the exterior of said casing, said casing having an opening whereby the interior thereof may be connected to a suitable point of static pressure.

2. In an aircraft air-speed indicator including a substantially cup-shaped casing, a dial and a pointer at the front end of said casing, the combination of a rotatable support journaled in said casing for rotation about an axis passing perpendicularly through the center of the dial and longitudinally of the casing and carrying the dial and pointer, a pressure responsive device mounted on and rotatable with said rotatable support, means connecting said device to said pointer for actuating the latter including a shaft to which said pointer is secured, means connecting the interior of said pressure responsive device to the exterior of the casing through substantially the center of the rear wall of the casing, and means forming an air-tight seal at the point where said connecting means passes through the rear wall of the casing whereby said pressure responsive device and its rotatable support together with the dial and pointer may be rotated about the longitudinal axis of said casing while maintaining a substantially air-tight connection between the interior of said pressure responsive device and the exterior of said casing.

3. In a pressure responsive indicator having a casing, the combination of a rotatable support journaled in said casing, a pressure responsive device mounted on and rotatable with said rotatable support, means connecting the interior of said pressure responsive device to the exterior of the casing, and means forming an air-tight seal at said connecting means whereby said pressure responsive device and its rotatable support may be rotated relative to the casing while maintaining a substantially air-tight connection between the interior of said pressure responsive device and the exterior of said casing.

4. In a pressure responsive indicator having a casing, the combination of a rotatable support journaled in said casing, a pressure responsive device mounted on and rotatable with said rotatable support, means connecting the interior of said pressure responsive device with the exterior of the casing, means forming an air-tight seal at said connecting means whereby said pressure responsive device and its rotatable support may be rotated relative to the casing while maintaining a substantially air-tight connection between the interior of said pressure responsive device and the exterior of said casing, and means for rotating said rotatable support and said pressure responsive device.

5. In a pressure responsive indicator having a casing, the combination of a rotatable support journaled in said casing, a pressure responsive device mounted on and rotatable with said support, means for connecting said casing to a source of pressure to be measured whereby said pressure responsive device is caused to expand and contract in accordance with changes in pressure at said source, and means forming an air-tight seal at said connecting means whereby said pressure responsive device and its rotatable support may be rotated relative to the casing while maintaining a substantially air-tight connection between the interior and exterior of said casing at said connecting means.

PHILIP F. WEBER.